Figure 1:
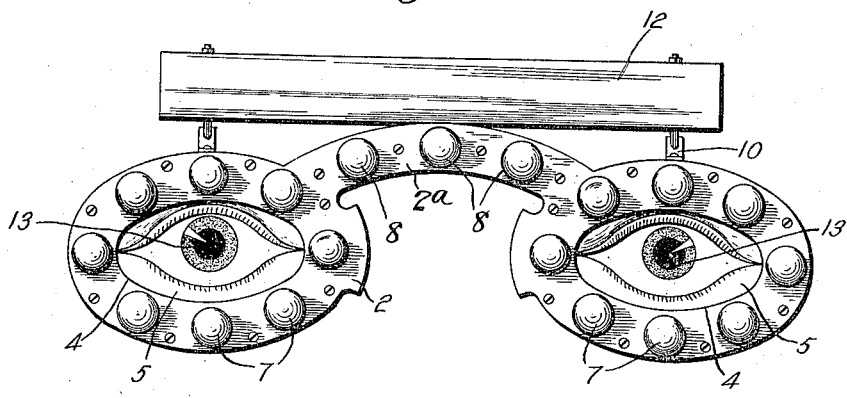

M. H. HARRIS.
DISPLAY SIGN.
APPLICATION FILED MAR. 21, 1913.

1,181,661.

Patented May 2, 1916.

WITNESSES

Moses H. Harris
INVENTOR
BY
ATTORNEY

UNITED STATES PATENT OFFICE.

MOSES H. HARRIS, OF NEW YORK, N. Y.

DISPLAY-SIGN.

1,181,661.  Specification of Letters Patent.  Patented May 2, 1916.

Application filed March 21, 1913. Serial No. 755,825.

*To all whom it may concern:*

Be it known that I, MOSES H. HARRIS, a citizen of the United States, residing in the city, county, and State of New York, have invented a new and useful Display-Sign, of which the following is a specification.

My invention relates to display signs and more particularly to signs adapted to advertise and call attention to business of an optical nature.

The object of this invention is to provide a sign with an illustration of eyes set within a frame formed in the design of eye glasses or spectacles, and adapted to be swung in front of the place of business and as the sign is effective in both directions, the attention of the passer-by in either direction of travel is attracted.

Further advantages of my invention are set forth in the following specification and illustrated in the drawings annexed hereto, in which—

Figure 2:
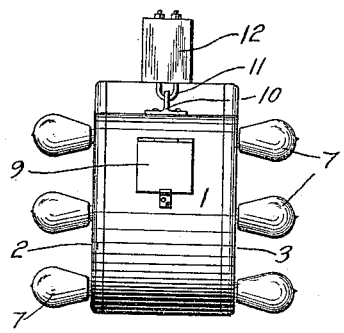
Figure 3:
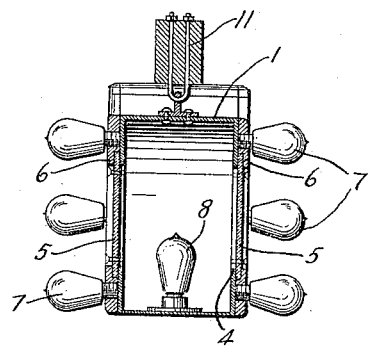

Figure 1 is a front elevation. Fig. 2 is an end elevation. Fig. 3 is a sectional view on line 3—3 of Fig. 1.

The drawings illustrate as an embodiment of this invention a duplex eyeglass advertising sign.

1 and 1 are two similar hollow oval casings, each having openings 4, 4 at its opposite ends. Two plates 2 and 3 are secured respectively to opposite sides of said casings, and each of said side plates includes two oval frames surrounding said openings of the casings and a bridge as 2ª connecting said frames, said bridge corresponding to the nose bridge of an eyeglass. Panes 5 of glass or other transparent or translucent material close the openings 4, being set at their edges in recesses 6 in the plates 2 and 3 between said plates and the walls of the casings. Electric bulbs 7 of the usual type are mounted in sockets secured to the side plates 2 and 3 and bulbs 8 are set in sockets secured to the inside of the casing 1. These external and internal lights can be carried in multiple or series on the same lead. For convenient access to the internal light bulbs, hand holes with suitable covers 9 are provided in the casing 1. Secured to the casing 1 are lugs 10 to coöperate with U bolts 11 which pass through a horizontal plate 12 adapted to be used as a space for a name or other reading matter. On the plates 5 a reproduction of a human eye 13 can either be painted or reproduced by decalcomania.

What I claim and desire to secure by Letters Patent is—

1. A duplex eyeglass advertising sign comprising two oval casings having openings in their opposite side walls, transparent panes closing said openings and having thereon representations of human eyes, two plates disposed on opposite sides of said casings and each including two oval frames surrounding said openings and a bridge connecting said frames, lamps disposed on said plates, and lamps disposed within said casings.

2. A duplex eyeglass advertising sign comprising two oval casings having openings in their opposite side walls, transparent panes closing said openings and having thereon representations of human eyes, two plates disposed on opposite sides of said casings and each including two oval frames surrounding said openings and a bridge connecting said frames, lamps disposed within said casings, and exterior lamps surrounding said oval frames and extending along said bridge.

In witness whereof, I have hereunto set my hand this 7th day of February, 1913.

MOSES H. HARRIS.

Witnesses:
 ANTHONY F. ARCOME,
 AGNES L. CLUNE.